US 9,447,896 B2

(12) United States Patent
Mukaide et al.

(10) Patent No.: US 9,447,896 B2
(45) Date of Patent: Sep. 20, 2016

(54) CONTROL VALVE AND ATTACHMENT STRUCTURE OF CONTROL VALVE

(71) Applicant: AISIN SEIKI KABUSHIKI KAISHA, Kariya-shi (JP)

(72) Inventors: Hiroki Mukaide, Chiryu (JP); Naoto Toma, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 117 days.

(21) Appl. No.: 14/454,154

(22) Filed: Aug. 7, 2014

(65) Prior Publication Data
US 2015/0059899 A1 Mar. 5, 2015

(30) Foreign Application Priority Data

Aug. 27, 2013 (JP) .................. 2013-175891

(51) Int. Cl.
*F01L 1/34* (2006.01)
*F16K 31/06* (2006.01)
*F01L 1/344* (2006.01)

(52) U.S. Cl.
CPC .......... *F16K 31/0613* (2013.01); *F01L 1/3442* (2013.01); *F01L 2001/3443* (2013.01); *F01L 2001/34426* (2013.01); *Y10T 137/86622* (2015.04)

(58) Field of Classification Search
CPC ................ F01L 1/3442; F01L 2001/34426; F01L 2001/3443; F16K 31/0613
USPC ................ 123/90.12, 90.17, 90.15
See application file for complete search history.

(56) References Cited

U.S. PATENT DOCUMENTS

| 7,533,695 B2 * | 5/2009 | Strauss ................ F01L 1/022 123/90.17 |
| 2005/0252561 A1 | 11/2005 | Strauss et al. |
| 2011/0174253 A1 | 7/2011 | Hoppe et al. |
| 2011/0303861 A1 | 12/2011 | Jones |
| 2013/0118428 A1 | 5/2013 | Suzuki et al. |

FOREIGN PATENT DOCUMENTS

DE  10 2007 058 491 A1  6/2009
DE  10 2010 013 777 A1  10/2011
(Continued)

OTHER PUBLICATIONS

The extended European Search Report issued on Mar. 12, 2015, by the European Patent Office in corresponding European Patent Application No. 14179910.6-1606. (5 pages).

*Primary Examiner* — Ching Chang
(74) *Attorney, Agent, or Firm* — Buchanan Ingersoll & Rooney PC

(57) ABSTRACT

A control valve includes a spool formed with a fluid passage allowing a circulation of an operation fluid for switching a supply of the operation fluid to plural operation fluid supply portions, a cylindrical sleeve including plural supply and exhaust ports supplying and exhausting the operation fluid to and from the plural operation fluid supply portions and plural drain ports allowing the operation fluid returning from the plural operation fluid supply portions to drain, the sleeve slidably accommodating the spool therein, a solenoid mechanism for changing a position of the spool relative to the sleeve, and a communication portion formed on an outer periphery surface of the sleeve, the communication portion connected to plural drain ports.

4 Claims, 9 Drawing Sheets

(56) References Cited

FOREIGN PATENT DOCUMENTS

| | | |
|---|---|---|
| EP | 1 596 041 A2 | 11/2005 |
| EP | 2 589 793 A1 | 5/2013 |
| JP | 2005-325841 A | 11/2005 |
| WO | 2010/088168 A1 | 8/2010 |

* cited by examiner

|  | PA2 | PA1 | PL | PB1 | PB2 |
|---|---|---|---|---|---|
| Advanced angle chamber | Oil supplied | Oil supplied | Oil blocked | Oil drained | Oil drained |
| Retarded angle chamber | Oil drained | Oil drained | Oil blocked | Oil supplied | Oil supplied |
| Lock member | Oil drained | Oil supplied | Oil supplied | Oil supplied | Oil drained |

CONTROL VALVE AND ATTACHMENT STRUCTURE OF CONTROL VALVE

CROSS REFERENCE TO RELATED APPLICATIONS

This application is based on and claims priority under 35 U.S.C. §119 to Japanese Patent Application 2013-175891, filed on Aug. 27, 2013, the entire content of which is incorporated herein by reference.

TECHNICAL FIELD

This disclosure generally relates to a control valve and an attachment structure of the control valve.

BACKGROUND DISCUSSION

JP2005-325841A (hereinafter referred to as Patent reference 1) discloses a control valve applied to a variable valve timing control device for controlling and changing an opening and closing timing of an intake valve and an exhaust valve provided at each of cylinders during an operation of an internal combustion engine. The control valve disclosed in Patent reference 1 includes an operation fluid supply source port (pressure medium connection portion), two supply and exhaust ports (operation connection portions) supplying and exhausting the operation fluid to two operation fluid supply portions, and two drain ports (tank connection portions) exhausting the operation fluid returning from the mentioned two operation fluid supply portions. That is, the drain ports corresponding to the supply and exhaust ports are provided, respectively.

According to the construction of the control valve disclosed in Patent reference 1, two supply and exhaust ports and two drain ports are necessary for two operation fluid supply portions. Further, although a fluid passage structure for controlling a lock mechanism provided at the variable valve timing control device is not explicitly disclosed in Patent reference 1, additional supply and exhaust port and drain port are necessary for the control valve in order to operate the lock mechanism with the common control valve. The same number of ports to the supply and exhaust ports and the drain ports provided at the control valve are required at the internal combustion engine where the control valve is mounted. Thus, as the number of ports formed at the control valve increases, the number of ports and fluid passages formed at the internal combustion engine increases, which makes structures of the fluid passages between the control valve and the operation fluid supply portion complex.

A need thus exists for a control valve and an attachment structure for the control valve which is not susceptible to the drawback mentioned above.

SUMMARY

In light of the foregoing, the disclosure provides a control valve, which includes a spool formed with a fluid passage allowing a circulation of an operation fluid for switching a supply of the operation fluid to plural operation fluid supply portions, a cylindrical sleeve including plural supply and exhaust ports supplying and exhausting the operation fluid to and from the plural operation fluid supply portions and plural drain ports allowing the operation fluid returning from the plural operation fluid supply portions to drain, the sleeve slidably accommodating the spool therein, a solenoid mechanism for changing a position of the spool relative to the sleeve, and a communication portion formed on an outer periphery surface of the sleeve, the communication portion connected to plural drain ports.

According to another aspect of the disclosure, an attachment structure of a control valve, the control valve includes a spool formed with a fluid passage allowing a circulation of an operation fluid for switching a supply of the operation fluid to plural operation fluid supply portions, a cylindrical sleeve including plural supply and exhaust ports supplying and exhausting the operation fluid to and from the plural operation fluid supply portions and plural drain ports allowing the operation fluid returning from the plural operation fluid supply portions to drain, the sleeve slidably accommodating the spool therein, a solenoid mechanism for changing a position of the spool relative to the sleeve, and a communication portion formed on an outer periphery surface of the sleeve, the communication portion connected to plural drain ports. The plural supply and exhaust ports are formed along a longitudinal direction of the sleeve keeping a predetermined distance from each other, and the plural drain ports are formed along the longitudinal direction of the sleeve keeping a predetermined distance from each other at positions different from the supply and exhaust ports in a circumferential direction of the sleeve. The communication portion corresponds to a chamfer portion that is formed by chamfering an outer periphery surface of the sleeve along a longitudinal direction of the outer periphery surface of the sleeve. The control valve is applied to a variable valve timing control device configured to change an opening and closing timing of a valve which is provided at an internal combustion engine for an intake and exhaust of air and including a lock mechanism for fixing the opening and closing timing of the valve at an intermediate phase between a most advanced angle phase and a most retarded angle phase. The plural drain ports includes a first drain port allowing the operation fluid to drain when a relative phase is changed to a retarded angle phase, a second drain port allowing the operation fluid to drain when the relative phase is changed to an advanced angle phase, and a third drain port allowing the operation fluid to drain when the lock mechanism is unlocked. The communication portion includes a first connection portion connecting the first drain port and the second drain port and a second connection portion connecting the second drain port and the third drain port, and a cross-sectional dimension of the first connection portion is greater than a cross-sectional dimension of the second connection portion. The attachment structure includes an attachment hole portion to which the sleeve is inserted to be fixed, the attachment hole portion formed on a wall portion of the internal combustion engine, the third drain port being formed at a furthermost end portion relative to the other drain ports, and an exhaust port connected to the communication portion for circulating the operation fluid in the communication portion inside the internal combustion engine, the exhaust port being formed between the third drain port and another drain port that is adjacent to the third drain port at an inner surface of the attachment hole portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

One embodiment of a control valve and an attachment structure of the control valve will be explained with reference to illustrations of drawing figures as follows.

Figure 1:
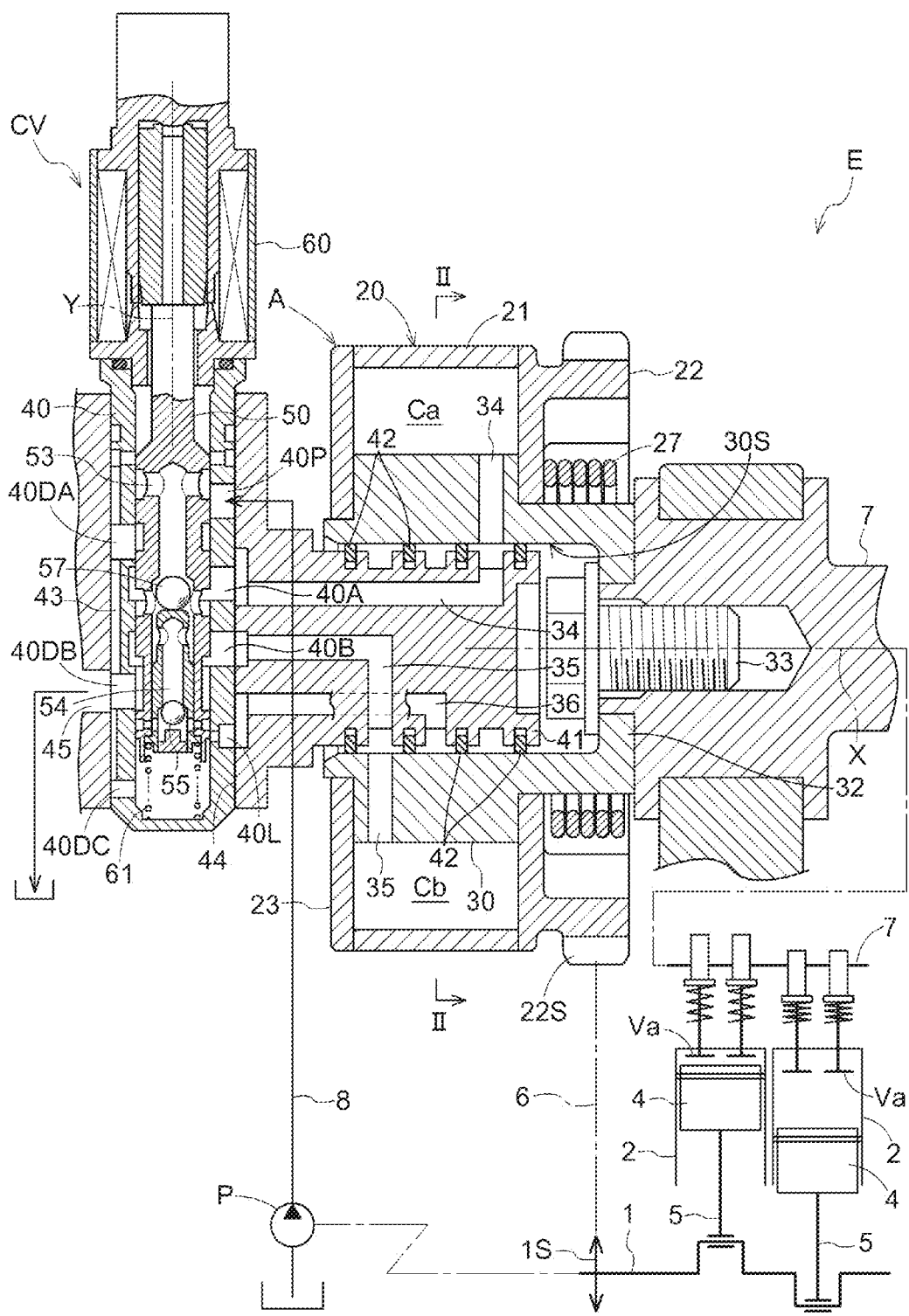
FIG. 1 is a schematic cross-sectional showing a construction of a variable valve timing control device in cross-section according to an embodiment disclosed here.

As shown in FIG. 1, a variable valve timing control device A for changing an open and close time (opening and closing timing) of, for example, an intake valve Va is provided for an engine E as an internal combustion engine. The variable valve timing control device A is configured to change the opening and closing timing of the intake valve Va by supplying and exhausting the operation fluid (operation oil) by a control valve CV.

The engine E (i.e., an example of the internal combustion engine) is provided at an automobile, for example. In the variable valve timing control device A, an outer rotor 20 serving as a driving side rotation member synchronously rotates with a crankshaft 1 of the engine E, and an inner rotor 30 serving as a driven side rotation member integrally rotates with an intake camshaft 7. The engine E includes an oil pump P driven by a driving force of the crankshaft 1. The oil pump P supplies the lubrication oil reserved in an oil pan of the engine E to the control valve CV as operation oil (i.e., an example of the operation fluid).

The engine E houses a piston 4 inside a cylinder bore formed at a cylinder block 2 and is formed in a four-cycle type in which the piston 4 and the crankshaft 1 are connected by a connecting rod 5. Further, the engine E includes the intake valve Va which is configured to open and close and provided at a top portion of a combustion chamber. The engine E further includes the intake camshaft 7 for opening and closing the intake valve Va.

According to the variable valve timing control device A, an advanced angle chamber Ca and a retarded angle chamber Cb are formed between the outer rotor 20 (i.e., an example of the driving side rotation member) and the inner rotor 30 (i.e., an example of the driven side rotation member). The control valve CV is configured to change a relative rotational phase of the outer rotor 20 and the inner rotor 30 (i.e., hereinafter referred to as the relative rotational phase) by supplying the operation oil as the operation fluid to the selected one of the advanced angle chamber Ca and the retarded angle chamber Cb. The control valve CV is configured to change timing for air intake of the intake valve Va by changing the relative rotational phase.

The control valve CV supports an axial portion 41 which is integrally formed with a wall portion of the internal combustion engine E in a manner that the axial portion is positioned inside the inner rotor 30. Thus, the control valve CV can supply and exhaust the operation oil with a short distance relative to the variable valve timing control device A. Alternatively, the control valve CV may be arranged at a position which is away from the variable valve timing control device A. According to the alternative construction, a fluid passage may be formed between the control valve CV and the variable valve timing control device A.

Further, a lock mechanism L for restricting the relative rotational phase of the outer rotor 20 and the inner rotor 30 at a predetermined phase is provided inside the variable valve timing control device A. The lock mechanism L maintains the relative rotational phase at the predetermined lock phase even in a state where the operation oil is not supplied at a start of the engine E. The control valve CV is configured to unlock the lock mechanism L (release the locked state of the lock mechanism L) by supplying the operation oil to the lock mechanism L.

According to the embodiment, the variable valve timing control device A is provided at the intake camshaft 7, however, the construction is not limited to the foregoing. For example, the variable valve timing control device A may be provided at an exhaust camshaft, or the variable valve timing control device A may be provided at both of the intake camshaft 7 and the exhaust camshaft.

Figure 2:
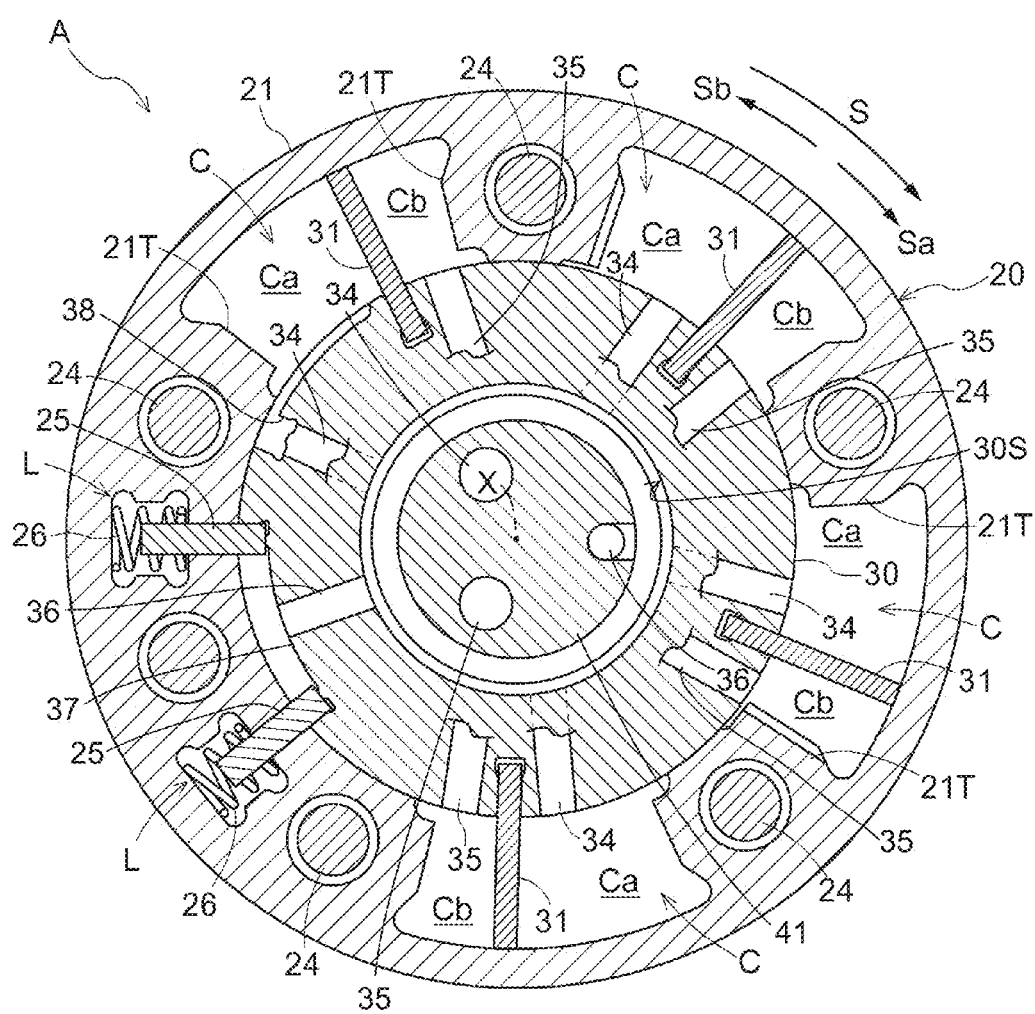
FIG. 2 is a schematic cross-sectional showing a driving side rotation member and a driven side rotation member which are in a locked state according to the embodiment disclosed here.
Figures 3, 4:
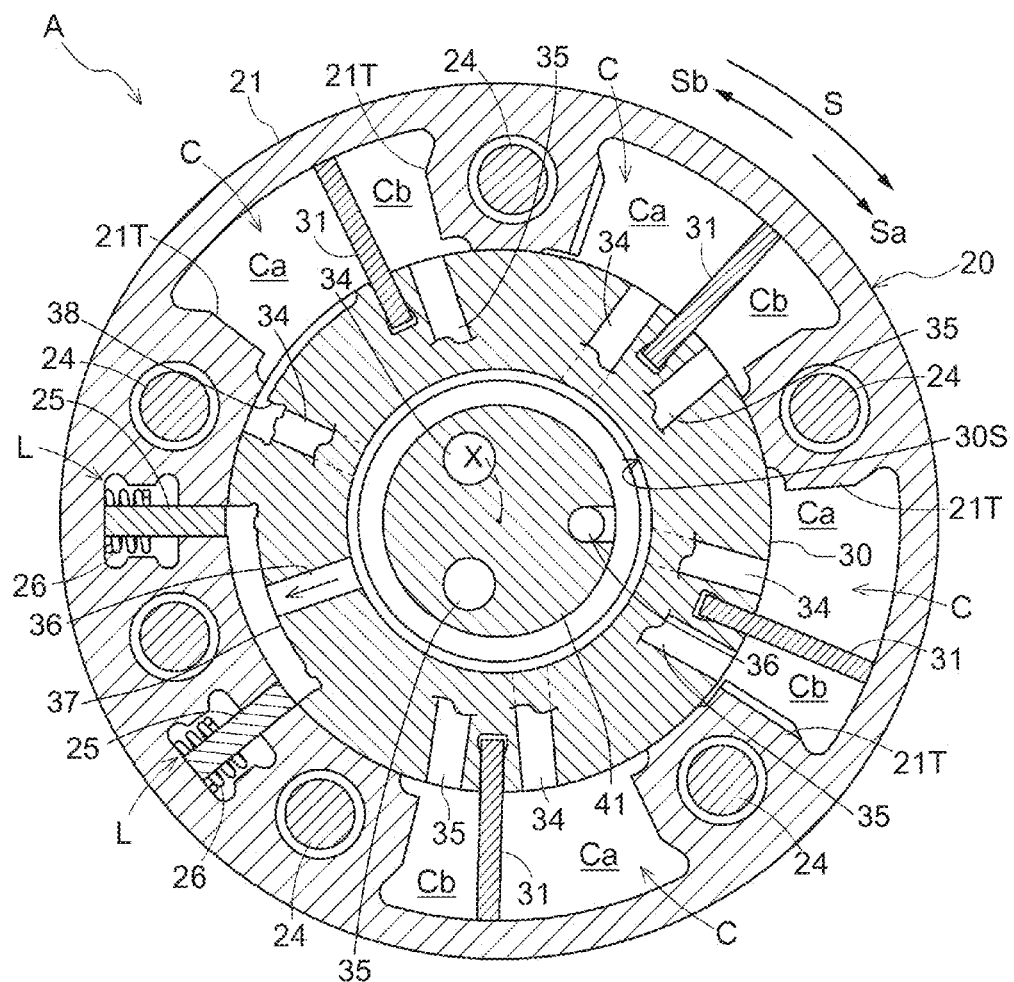
FIG. 3 is a schematic cross-sectional showing the driving side rotation member and the driven side rotation member which are in an unlocked state according to the embodiment disclosed here.
FIG. 4 shows operation patterns of a control valve according to the embodiment disclosed here.

Constructions of the variable valve timing control device A will be explained with reference to FIGS. 1 to 3. As illustrated in FIGS. 1 to 3, in the variable valve timing control device A, the outer rotor 20 encloses the inner rotor 30, and the outer rotor 20 and the inner rotor 30 are coaxially positioned to a rotational axis X of the intake camshaft 7 to be relatively rotatable to each other. A timing chain 6 is wound around a driving sprocket 22S formed on the outer rotor 20 and around a sprocket 1S driven by the crankshaft 1. Further, the inner rotor 30 is connected to the intake camshaft 7 by means of a connection bolt 33.

The outer rotor 20 includes a rotor member 21 formed in a cylindrical shape, a rear block 22 positioned in contact with a first end of the rotor member 21 in a direction along the rotational axis X, and a front plate 23 positioned in contact with a second end of the rotor member 21 in the direction along the rotational axis X. The rear block 22 and the front plate 23 are fastened by plural fastening bolts 24. The driving sprocket 22S to which a rotational force is transmitted from the crankshaft 1 is formed at an outer periphery of the rear block 22. Plural protrusion portions 21T which protrude towards the rotational axis X (protrude radially inward) and a cylindrical inner wall surface are integrally formed at the rotor member 21.

A pair of guide grooves is formed on one of the protrusion portions 21T in a manner radially extending from the rotational axis X. A lock member 25 formed in a plate shape is provided in each of the guide grooves to be selectively protruded and retracted. A lock spring 26 for biasing the lock member 25 towards the rotational axis X is provided inside the rotor member 21 (e.g., in a space formed inside the protrusion portion 21T and continuously formed with the guide groove). The lock mechanism L is structured with lock members 25 serving as a pair and the lock springs 26 that bias the lock members 25 in a protruding direction, respectively. The configuration of the lock member 25 is not limited to the plate shape. Alternatively, the lock member 25 may be formed in a rod shape, for example.

The inner rotor 30 is formed with an inner peripheral surface 30S which is formed in a cylindrical inner surface and arranged coaxially to the rotational axis X. The inner rotor 30 is further formed with an outer periphery surface about the rotational axis X, and plural vanes 31 which protrude outwardly are fitted to the outer peripheral surface. A flange portion 32 is formed at a first end of the inner rotor 30 in a direction along the rotational axis X. The inner rotor 30 is connected to the intake camshaft 7 by means of the connection bolt 33 which is inserted to and positioned in a bore portion provided at an inner peripheral position of the flange portion 32.

Further, by fitting the inner rotor 30 in the outer rotor 20 (by enclosing the inner rotor 30 by the outer rotor 20), a fluid pressure chamber C is formed at a region defined by an inner surface of the rotor member 21 (cylindrical inner wall surface and the plural protrusion portions 21T) and the outer peripheral surface of the inner rotor 30. Further, the fluid pressure chamber C is divided by the vane 31 to form the advanced angle chamber Ca and the retarded angle chamber Cb. The inner rotor 30 is formed with an advanced angle fluid passage 34 which is in communication with the advanced angle chamber Ca, a retarded angle fluid passage 35 which is in communication with the retarded angle chamber Cb, and an unlocking fluid passage 36.

An intermediate lock recessed portion 37 formed in a groove shape is formed on the outer periphery of the inner rotor 30. The lock members 25 of the lock mechanism L serving as a pair is engageable with and disengageable from the intermediate lock recessed portion 37. Further, a most retarded angle lock recessed portion 38 is formed at the outer periphery of the inner rotor 30. One of the lock members 25 is engaged with the most retarded angle lock recessed portion 38 when a rotational phase attained by a displacement of the relative rotational phase towards a retarded angle direction Sb from the relative rotational phase at which the lock members 25 serving as a pair engage with the intermediate lock recessed portion 37 is established. That is, when the relative rotational phase is at a most retarded angle phase, the lock member 25 is engaged with the most retarded angle lock recessed portion 38. The intermediate lock recessed portion 37 and the most retarded angle lock recessed portion 38 are recessed in a direction towards the rotational axis X relative to the outer peripheral surface of the inner rotor 30. The unlocking fluid passage 36 is in communication with the intermediate lock recessed portion 37 and the advanced angle fluid passage 34 is in communication with the most retarded angle lock recessed portion 38.

At the intermediate lock phase, the lock members 25 come in contact with opposite ends of an inner wall of the intermediate lock recessed portion 37, respectively. Upon the supply of the operation oil to the unlocking fluid passage 36 at the intermediate lock phase, the lock members 25 are disengaged against the biasing force of the lock springs 26, respectively (i.e., the locked state is released). In those circumstances, the intermediate lock phase does not specify the center of a region in which the relative rotational phase is changeable; rather, the intermediate lock phase is defined as any phase which is included in an intermediate region excluding a most advanced angle phase and the most retarded angle phase.

Further, at the most retarded angle lock phase, one of the lock members 25 is engaged with the most retarded angle lock recessed portion 38. Upon the supply of the operation oil to the advanced angle fluid passage 34 at the most retarded angle lock phase, the lock member 25 is disengaged from the most retarded angle lock recessed portion 38 against the biasing force of the lock spring 26, and the relative rotational phase is displaced in the advanced angle direction Sa.

Further, a torsion spring 27 is provided to extend at the rear block 22 of the outer rotor 20 and the inner rotor 30. The torsion spring 27 exerts the biasing force for displacing the relative rotational phase from the most retarded angle lock phase to a phase in the vicinity of the intermediate lock phase.

According to the variable valve timing control device A, the outer rotor 20 rotates in a driving rotation direction S by the driving force transmitted from the timing chain 6. A rotation direction of the inner rotor 30 relative to the outer rotor 20 in the same direction with the driving rotation direction S is defined as the advanced angle direction Sa. A rotation direction of the inner rotor 30 relative to the outer rotor 20 in the direction reversal from the advanced angle direction Sa is defined as the retarded angle direction Sb. According to the variable valve timing control device A, the crankshaft 1 and the intake camshaft 7 are arranged so as to increase a compression ratio of the intake air in response to an increase in a displacement amount when the relative rotational phase is displaced in the advanced angle direction Sa and so as to decrease the compression ratio of the intake air in response to an increase in a displacement amount when the relative rotational phase is displaced in the retarded angle direction Sb.

Further, by supplying the operation oil to the advanced angle chamber Ca, the relative rotational phase is displaced in the advanced angle direction Sa, and the relative rotational phase is displaced in the retarded angle direction Sb by supplying the operation oil to the retarded angle chamber Cb. A relative rotational phase in a state where the vane 31 reaches a movable end in the advanced angle direction Sa (i.e., rotation limit about the rotational axis X) is defined as a most advanced angle phase. A relative rotational phase in a state where the vane 31 reaches a movable end in the retarded angle direction Sb (i.e., rotation limit about the rotational axis X) is defined as a most retarded angle phase.

The most retarded angle phase does not refer only to the relative rotational phase that is the limit of the operation (rotation) at the most retarded angle side. The most retarded angle phase includes a phase in the vicinity of the operation limit (rotation limit) at the most retarded angle side. Thus, the retarded angle lock phase includes the most retarded angle lock phase and a phase in the vicinity of the most retarded angle which is closer to the intermediate phase than the most retarded angle lock phase. Similarly, the most advanced angle phase is not limited to the operation limit (rotation limit) at the most advanced angle side. The most advanced angle phase includes a phase in the vicinity of the operation limit (rotation limit) at the most advanced angle side.

Further, according to the variable valve timing control device A of the embodiment, when the lock mechanism L fixes the relative rotational phase at the intermediate lock phase, the intermediate lock phase is not limited to the intermediate lock phase shown in FIG. 2. Alternatively, the relative rotational phase may be fixed at a phase where the inner rotor 30 is displaced in either the advanced angle direction Sa or the retarded angle direction Sb compared to the rotational phase shown in FIG. 2 when the lock mechanism L fixes the relative rotational phase at the intermediate lock phase.

Figure 5:
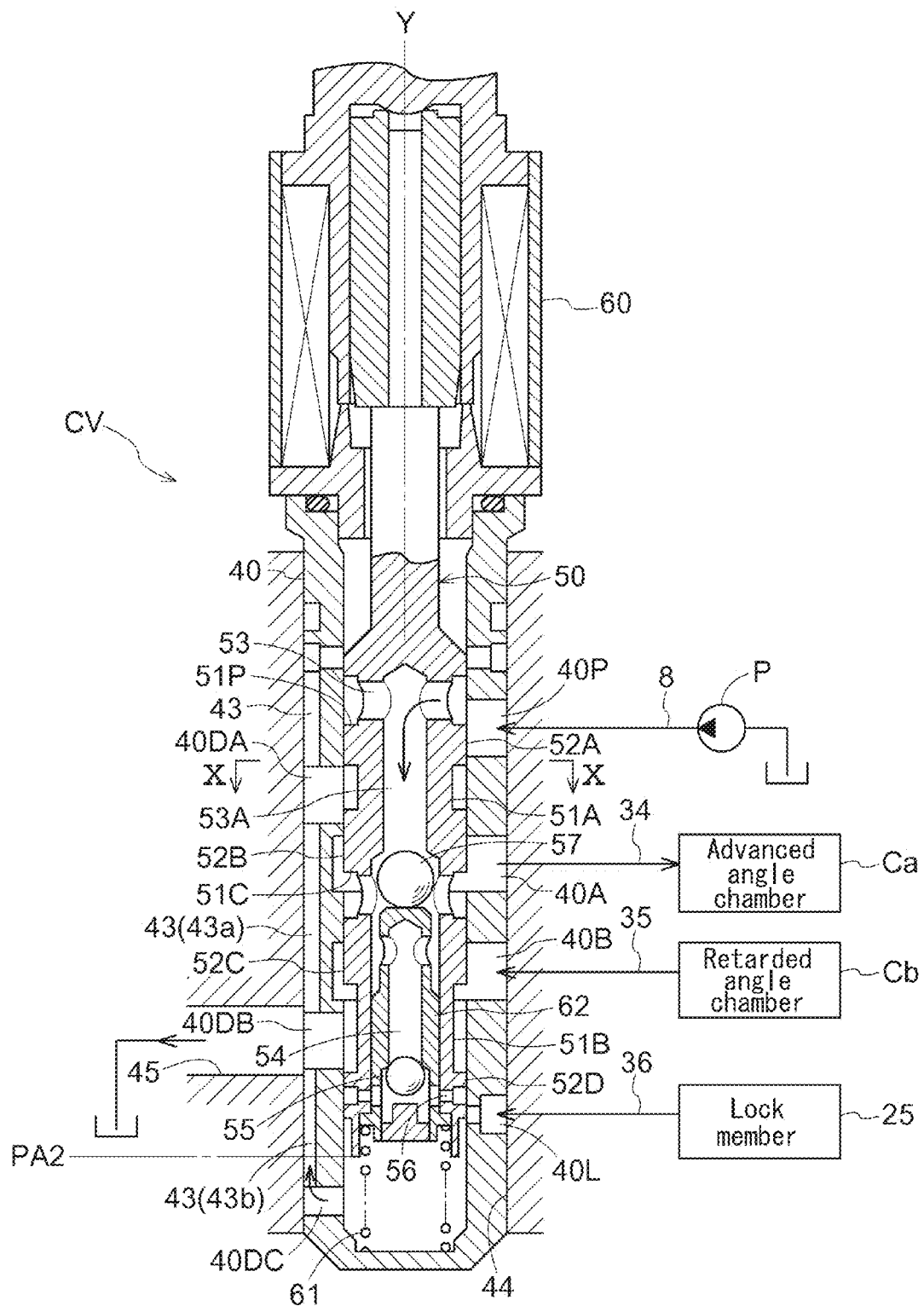
FIG. 5 is a schematic cross-sectional showing an operation of the control valve according to the embodiment disclosed here.

Constructions of the control valve of the embodiment will be explained hereinafter. As illustrated in FIGS. 1 and 5, the control valve CV includes the cylindrical valve case 40 (i.e., an example of the sleeve), a spool 50 housed in the valve case 40, a solenoid mechanism 60 configured to change the position of the spool 50, and a spool spring 61 for biasing the spool 50 towards the solenoid mechanism 60.

According to the control valve CV, a spool axis Y in a longitudinal attitude is defined along a lengthwise direction (longitudinal direction) at the center of an axis of the spool 50 formed in a shaft configuration. A spool accommodation space is cylindrically formed at the valve case 40 about the spool axis Y. The spool 50 is accommodated in the spool accommodation space to be slidable along the spool axis Y.

The valve case 40 is configured to be supported by the engine E via a bracket, for example. More particularly, an attachment hole portion 44 allowing the valve case 40 to be inserted and fixed is formed at a wall portion of the internal combustion engine E. The shaft portion 41 which is formed in a cylindrical shape coaxially to the rotation axis X and formed with plural fluid passages allowing the supply and exhaust of the fluid is integrally formed with the wall portion of the internal combustion engine E that includes the attachment hole portion 44, and the shaft portion 41 is inserted to be positioned in the inner rotor 30. Further, in order to supply and exhaust the operation oil when the variable valve timing control device A rotates about the rotation axis X, plural ring shaped seals 42 are provided between an outer periphery of the shaft portion 41 and the inner peripheral surface 30S of the inner rotor 30.

The valve case 40 includes a pump port 40P, an advanced angle port 40A, a retarded angle port 40B, an unlocking port 40L, a first drain port 40DA, a second drain port 40DB, and a third drain port 40DC. That is, the valve case 40 includes plural supply and exhaust ports (advanced angle port 40A, retarded angle port 40B, unlocking port 40L) for supplying and exhausting the operation oil to and from plural operation fluid supply portions (advanced angle chamber Ca, retarded angle chamber Cb, lock mechanism L) and plural drain ports (first drain port 40DA, second drain port 40DB, third drain port 40DC) allowing the operation oil returning from the plural operation fluid supply portions to drain.

A communication portion 43 connecting the plural drain ports (first drain port 40DA, second drain port 40DB, third drain port 40DC) is formed on the outer periphery surface of the valve case 40. The communication portion 43 includes a first connection portion 43a and a second connection portion 43b. The first connection portion 43a is formed between the first drain port 40DA and the second drain port 40DB. The second connection portion 43b is formed between the second drain port 40DB and the third drain port 40DC. By connecting a single drain fluid passage to the communication portion 43, the operation oil drained from the plural drain ports can be returned to, for example, a tank via the drain fluid passage. Thus, the construction of the fluid passage formed at the device to which the control valve is mounted can be simplified.

Figure 10:
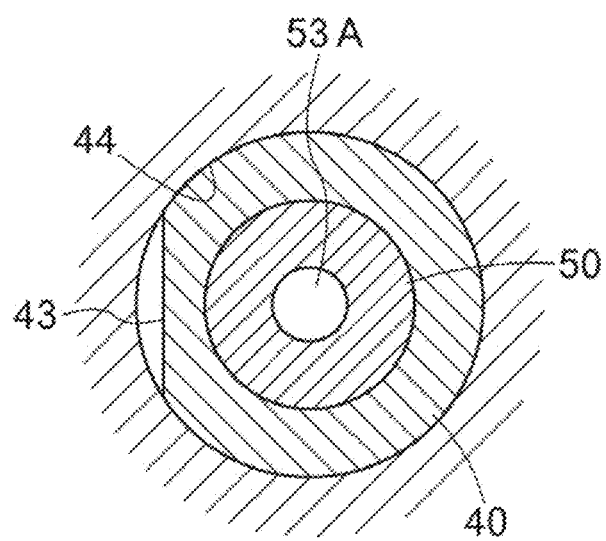
FIG. 10 is a schematic cross-sectional of the control valve taken along line X-X in FIG. 5 according to the embodiment disclosed here.

According to the embodiment, as illustrated in FIG. 10, the communication portion 43 corresponds to a chamfered portion formed by chamfering the outer periphery surface of the valve case 40 along the longitudinal direction. Thus, the communication portion 43 can be readily formed.

The plural supply and exhaust ports (advanced angle port 40A, retarded angle port 40B, unlocking port 40L) are formed on the valve case 40 along the longitudinal direction with predetermined distances from one another. On the other hand, the plural drain ports (first drain port 40DA, second drain port 40DB, third drain port 40DC) are formed on the valve case 40 along the longitudinal direction with predetermined distances from one another at different positions from the plural supply and exhaust ports (advanced angle port 40A, retarded angle port 40B, unlocking port 40L) in a circumferential direction of the valve case 40. Accordingly, the communication portion 43 can be readily formed.

According to the embodiment, the advanced angle port 40A is positioned at a higher position and the retarded angle port 40B is positioned lower than the advanced angle port 40A. However, alternatively, the retarded angle port 40B may be positioned at a higher position and the advanced angle port 40A may be positioned lower than the retarded angle port 40B.

The volume of the operation oil drained from the advanced angle chamber Ca and the retarded angle chamber Cb to a drain portion is greater than the volume of the operation oil drained from the lock mechanism L. Further, the operation oil may be drained from the lock mechanism L simultaneous with draining the operation oil from the advanced angle chamber Ca or the retarded angle chamber Cb. In those circumstances, the operation oil with greater volume among the lock mechanism L and the advanced angle chamber Ca or the retarded angle chamber Cb is preferentially drained due to the hydraulic pressure. Thus, because of the influence of the operation oil drained (flowing out) from the advanced angle chamber Ca or the retarded angle chamber Cb, the drain (flowing out) of the operation oil from the lock mechanism L is delayed. In light of the foregoing, according to the construction of the embodiment, a cross-sectional dimension of the first connection portion 43a (i.e., a first fluid passage) that connects the first drain port 40DA and the second drain port 40DB is greater than a cross-sectional dimension of the second connection portion 43b (i.e., a second fluid passage) that connects the second drain port 40DB and the third drain port 40DC. Accordingly, the draining of the operation oil from the first drain port 40DA and the second drain port 40DB can be performed in a short period. In consequence, when the operation oil is drained (flows out) from the third drain port 40DC, a situation where the operation oil in the first drain port 40DA and the second drain port 40DB may affect the unlocking operation of the lock mechanism L can be resolved at an early stage.

The attachment hole portion 44 allowing the valve case 40 to be inserted and fixed is formed at the wall portion of the internal combustion engine. The third drain port 40DC is formed at a furthermost end relative to the drain ports 40DA, 40DB. An exhaust port 45 connected to the communication portion 43 is provided at the attachment hole portion 44 so that the operation oil in the communication portion 43 returns to the inside of the engine E to circulate therein. According to the embodiment, the exhaust port 45 is positioned at a position that faces the second drain port 40DB at the inner surface of the attachment portion 44. A fluid passage dimension of the exhaust port 45 is greater than a fluid passage dimension of the second drain port DB.

Generally, the volume of the operation oil supplied to and exhausted from the lock mechanism L is smaller than the volume of the operation oil supplied to and exhausted from the advanced angle chamber Ca and the retarded angle chamber Cb. Thus, in a case where the communication portion 43 between the third drain port 40DC and the exhaust port 45 overlaps with the communication portion 43 between the exhaust port 45 and the first drain port 40DA or between the exhaust port 45 and the second drain port 40DB at a part of the region, the third drain port 40DC may be influenced by the pulsation (pressure wave) of the operation oil drained from the first drain port 40DA or the second drain port 40DB. In consequence, the unlocking operation of the lock mechanism L may be delayed because of the time required for draining the operation oil from the third drain port 40DC, or the lock mechanism L may be unlocked without intension.

However, according to the construction of the embodiment, the communication portion 43 from the third drain port 40DC to the exhaust port 45 (second connection portion 43b) and the communication portion 43 from other drain ports 40DA, 40DB to the exhaust port 45 (first connection portion 43a) is entirely (thoroughly) divided (separated), and the operation oil drained from the drain ports 40DA, 40DB is drained from the exhaust port 45 before affecting the operation oil in the third drain port 40DC. Thus, the lock mechanism L is operated more securely.

In a case where the exhaust port 45 is connected to the second connection portion 43b at a position which does not face the second drain port 40DB, the operation oil drains (flows out) from the advanced angle chamber Ca (or retarded angle chamber Cb) to the exhaust port 45 via the first drain port 40DA (or second drain port 40DB) and the second connection portion 43b, and the operation oil drains (flows out) from the lock mechanism L to the exhaust port 45 via the third drain port 40DC and the second connection portion 43b. Normally, the pressure of the operation oil flowing out from the advanced angle chamber Ca (or retarded angle chamber Cb) (i.e., first operation oil pressure) is greater than the pressure drained or flowing out from the lock mechanism L (i.e., second operation oil pressure). Thus, the operation oil drained from the third drain port 40DC may flow in a reversal direction by the influence of the first operation oil pressure at the second connection portion 43b.

According to the construction of the embodiment, the exhaust port 45 is positioned facing the second drain port 40DB at the inner surface of the attachment hole portion 44. According to this construction, the operation oil drained from the first drain port 40DA (second drain port 40DB) is exhausted to the exhaust port 45 without passing through the second connection portion 43b. Accordingly, the operation oil drained (flowing out) from the third drain port 40DC is exhausted to the exhaust port 45 without being influenced by the first operation oil pressure at the second connection portion 43b. In consequence, the reversal flow of the operation oil drained from the third drain port 40DC can be more securely prevented and the lock mechanism L can be more securely operated.

As illustrated in FIG. 5, the spool 50 is formed with a fluid passage that allows the circulation of the operation fluid so as to switch the supply of the operation oil relative to the plural operation fluid supply portions, that is, the advanced angle chamber Ca, the retarded angle chamber Cb, and the lock mechanism L. The spool 50 includes a pump side groove portion 51P having a small diameter, a first groove portion 51A for draining and having a small diameter, a control side groove portion 51C serving as a fluid distribution portion, and a second groove portion 51B. The pump side groove portion 51P is formed at an upper end position in the direction of the spool axis Y (i.e., the position closer to the solenoid mechanism 60). The first groove portion 51A, the control side groove portion 51C and the second groove portion 51B are formed on the spool 50 below the pump side groove portion 51P in the mentioned order.

A first land portion 52A, a second land portion 52B, a third land portion 52C, and a fourth land portion 52D are formed in the mentioned order at the spool 50 below the pump side groove portion 51P (i.e., the position opposite from the solenoid mechanism 60). An outer diameter of the first land portion 52A, the second land portion 52B, the third land portion 52C, and the fourth land portion 52D is determined at a value close to (approximate to) the dimension of the spool accommodation space of the valve case 40.

A single phase control fluid passage 53 is formed at the pump side groove portion 51P in a manner being orthogonal to the spool axis Y. A diverging fluid passage 53A is formed along the spool axis Y in a manner diverging from an intermediate position of the phase control fluid passage 53 along the spool axis Y. A lock control fluid passage 54 is formed at a position in an extending direction of the diverging fluid passage 53A. The diverging fluid passage 53A is in communication with the control side groove portion 51C (an example of the fluid distribution portion). A check valve 57 for control, which includes a ball and a spring, is provided at a position closer to the phase control fluid passage 53 than a portion where the control side groove portion 51C and the diverging fluid passage 53A communicate one another.

A check valve 55 for maintaining unlocked state, which includes a ball and a spring, is provided at a downstream side of the diverging fluid passage 53A via a retaining member 62. The check valve 55 for maintaining unlocked state is formed on the lock control fluid passage 54 inside the retaining member 62.

A lock operation fluid passage 56 is formed orthogonally to the spool axis Y so that the lock operation fluid passage 56 establishes communication with an outer periphery portion of the fourth land portion 52D. A portion of the lock control fluid passage 54 at the downstream side relative to the check valve 55 for maintaining unlocked state and the lock operation fluid passage 56 are in communication with each other.

Operations of the control valve CV will be explained hereinafter. The control valve CV of the embodiment is configured to operate the spool 50 to a certain position against the biasing force of the spool spring 61 in accordance with the setting of the electric power supplied to the solenoid mechanism 60. As illustrated in FIG. 4, the spool 50 is configured to be operated to be positioned at a first advanced angle position PA1, a second advanced angle position PA2, an unlock position PL, a first retarded angle position PB1, and a second retarded angle position PB2 as operation positions.

At the first advanced angle position PA1, the operation oil is supplied to the advanced angle port 40A and the unlocking port 40L, and the operation oil is drained from the retarded angle port 40B. At the second advanced angle position PA2, the operation oil is supplied only to the advanced angle port 40A, and the operation oil is drained from the unlocking port 40L and the retarded angle port 40B. At an unlock position PL, the operation oil is supplied only to the unlocking port 40L, and the operation oil is drained from the advanced angle port 40A and the retarded angle port 40B. At the first retarded angle position PB1, the operation oil is supplied to the retarded angle port 40B and the unlocking port 40L, and the operation oil is drained from the advanced angle port 40A. At the second retarded angle position PB2, the operation fluid is supplied only to the retarded angle port 40B and the operation fluid is drained from the advanced angle port 40A and the unlocking port 40L.

According to the embodiment, the spool 50 establishes the second advanced angle position PA2 in a state where the electric power is not supplied to the solenoid mechanism 60, and the state, or the position of the spool 50 is changed to the first advanced angle position PA1, the unlocking portion PL, the first retarded angle position PB1, and the second retarded angle position PB2 in the mentioned order by increasing the electric power supplied to the solenoid mechanism 60 by a predetermined value.

Particularly, by providing the plural positions, by the reduction of the electric current value supplied to the solenoid mechanism 60 by a predetermined value, the state of the spool 50 is changed from a state where the spool 50 is operated at the unlocking position PL at the center position to the first advanced angle position PA1, and further to the second advanced angle position PA2. Similarly, by the increase of the electric current value supplied to the solenoid mechanism 60 by a predetermined value, the state of the spool 50 is changed from the state where the spool 50 is operated at the unlocking position PL at the center position to the first retarded angle position PB1, and further to the second retarded angle position PB2.

The second advanced angle position will be explained in more detail hereinafter. In a state where the electric power is not supplied to the solenoid mechanism 60, the spool 50 is positioned at the second advanced angle position PA2. At the second advanced angle position PA2, as illustrated in FIG. 5, the operation oil supplied to the pump port 40P is supplied to the advanced angle port 40A via the phase control fluid passage 53 and the control side groove portion 51C on the basis of the positional relationship between the second land portion 52B and the advanced angle port 40A. The operation oil from the retarded angle port 40B is drained to the second drain port 40DB via the second groove portion 51B on the basis of the positional relationship between the third land portion 52C and the retarded angle port 40B. The operation oil from the unlocking port 40L is drained from the third drain port 40DC.

When the operation oil is supplied to the lock control fluid passage 54 from the diverging fluid passage 53A, the check valve 57 for control is released, or opened by the operation oil pressure so that the operation oil is supplied to the advanced angle port 40A. Further, the operation oil drained to the second drain port 40DB is forwarded to the exhaust port 45, then, the operation oil is returned to the oil pan from the exhaust port 45. The operation oil drained to the third drain port 40DC is forwarded to the exhaust port 45 via the communication portion 43, then, the operation oil is returned to the oil pan from the exhaust port 45. The operation oil returned to the oil pan in the foregoing manner is recirculated inside the internal combustion engine.

Figure 6:
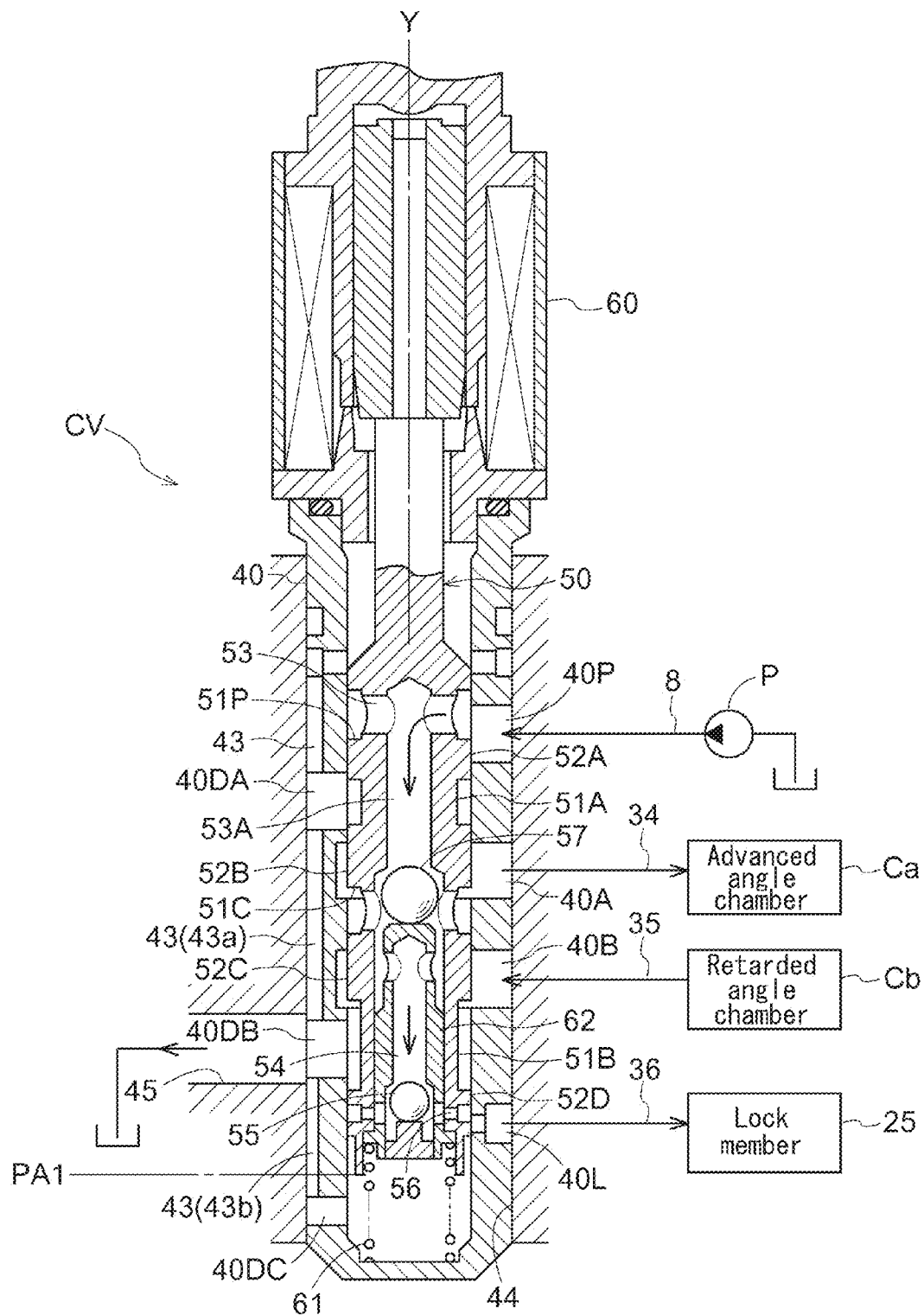
FIG. 6 is a schematic cross-sectional showing an operation of the control valve according to the embodiment disclosed here.

The first advanced angle position will be explained in detail hereinafter. As illustrated in FIG. 6, at the first advanced angle position PA1, similarly to the second advanced angle position PA2, the operation oil supplied to the pump port 40P is supplied to the advanced angle port 40A via the phase control fluid passage 53 and the control side groove portion 51C on the basis of the positional relationship between the first land portion 52A and the advanced angle port 40A. Further, the operation oil from the retarded angle port 40B is drained to the second drain port 40DB via the second groove portion 51B on the basis of the positional relationship between the third land portion 52C and the retarded angle port 40B. The operation oil drained to the second drain port 40DB is forwarded to the exhaust port 45 via the communication portion 43, then the operation oil is returned to the oil pan from the exhaust port 45.

Further, at the first advanced angle portion PA1, because the lock operation fluid passage 56 is positioned so as to be in communication with the unlocking port 40L, the operation oil pressure is applied to the lock control fluid passage 54 that diverges from the phase control fluid passage 53 to open the check valve 55 for maintaining unlocked state, thus supplying the operation oil to the unlocking port 40L.

Figure 7:
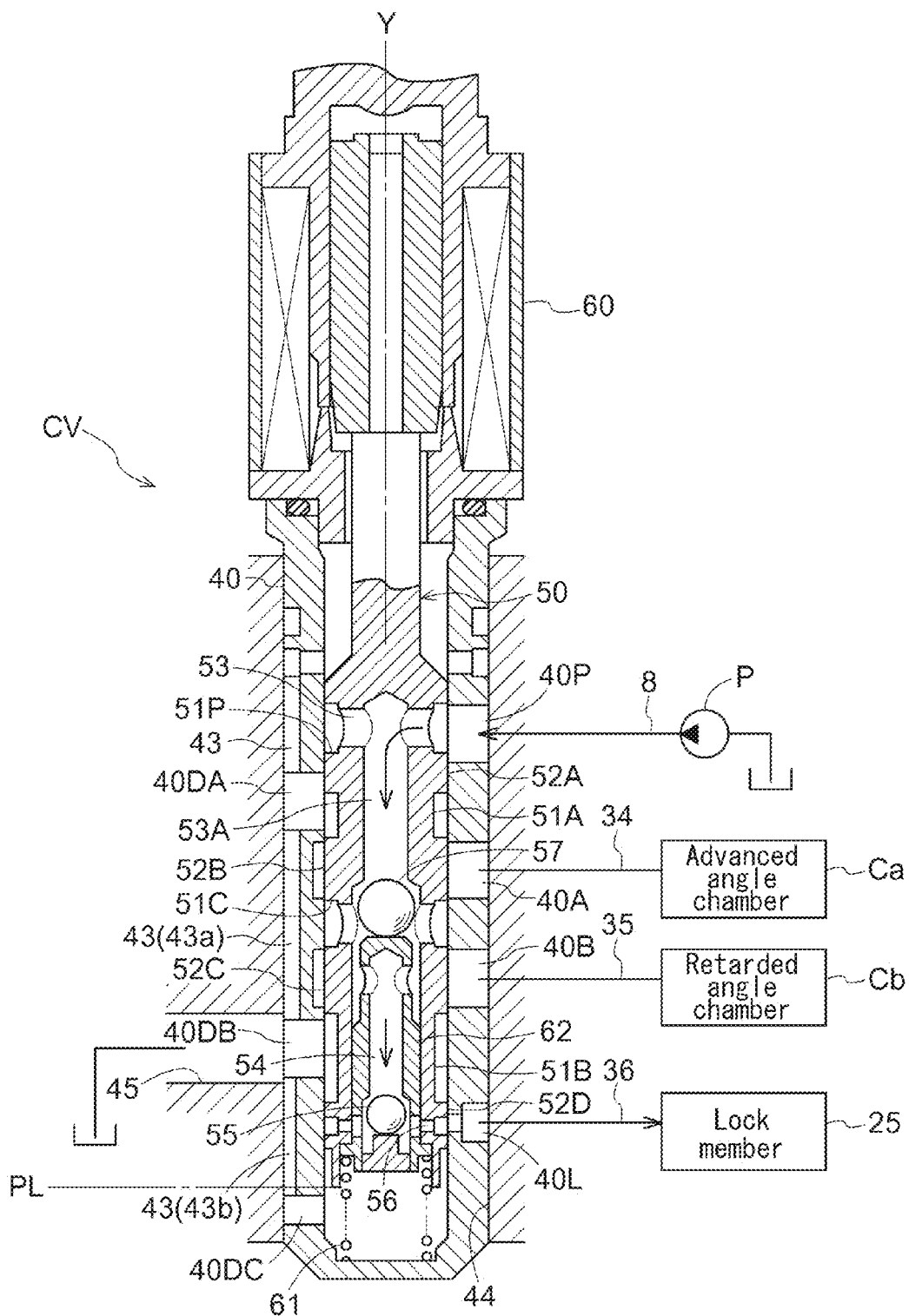
FIG. 7 is a schematic cross-sectional showing an operation of the control valve according to the embodiment disclosed here.

The unlock position PL will be explained in detail hereinafter. As illustrated in FIG. 7, at the unlock position PL, the second land portion 52B closes the advanced angle port 40A, and the third land portion 52C closes the retarded angle port 40B. Further, the lock operation fluid passage 56 is positioned so as to be in communication with the unlocking port 40L (the lock operation fluid passage 56 comes to communicate with the unlocking port 40L when the control valve CV is at the unlock position PL). That is, the operation oil is blocked at the advanced angle port 40A and the retarded angle port 40B, the operation oil pressure is applied to the lock control fluid passage 54 from the diverging fluid passage 53A that is diverged from the phase control fluid passage 53 to open the check valve 55 for maintaining unlocked state, then, the operation oil is supplied to the unlocking port 40L.

At the unlock position PL, the operation oil is supplied to the unlocking port 40L by opening, or releasing the check valve 57 for control and the check valve 55 for maintaining unlocked state.

Figure 8:
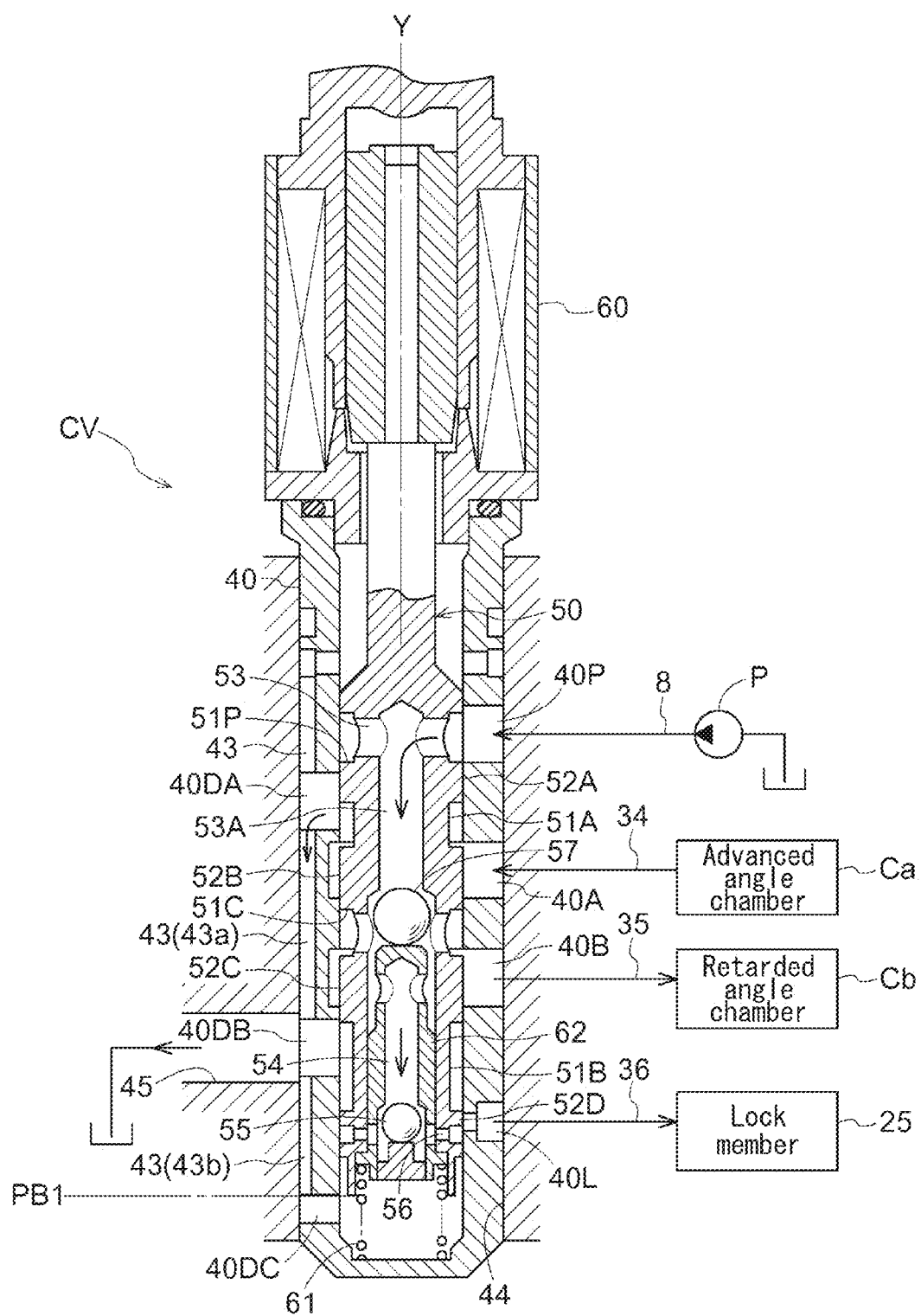
FIG. 8 is a schematic cross-sectional showing an operation of the control valve according to the embodiment disclosed here.

The first retarded angle position will be explained in detail hereinafter. As illustrated in FIG. 8, at the first retarded angle position PB1, the operation oil supplied to the pump port 40P is supplied to the retarded angle port 40B via the phase control fluid passage 53 and the lock control fluid passage 54 on the basis of the positional relationship between the third land portion 52C and the retarded angle port 40B. Further, the operation oil from the advanced angle port 40A is drained to the first drain port 40DA via the first groove portion 51A on the basis of the positional relationship between the second land portion 52B and the advanced angle port 40A. The operation oil drained to the first drain port 40DA is forwarded to the exhaust port 45 via the communication portion 43, then the operation oil is returned to the oil pan from the exhaust port 45.

Further, at the first retarded angle position PB1, because the lock operation fluid passage 56 is positioned so as to be in communication with the unlocking port 40L (because the lock operation fluid passage 56 comes to communicate with the unlocking port 40L), the operation oil pressure is applied to the lock control fluid passage 54 from the diverging fluid passage 53A that diverges from the phase control fluid passage 53 to open the check valve 55 for maintaining unlocked state, then the operation oil is supplied to the unlocking port 40L.

Figure 9:
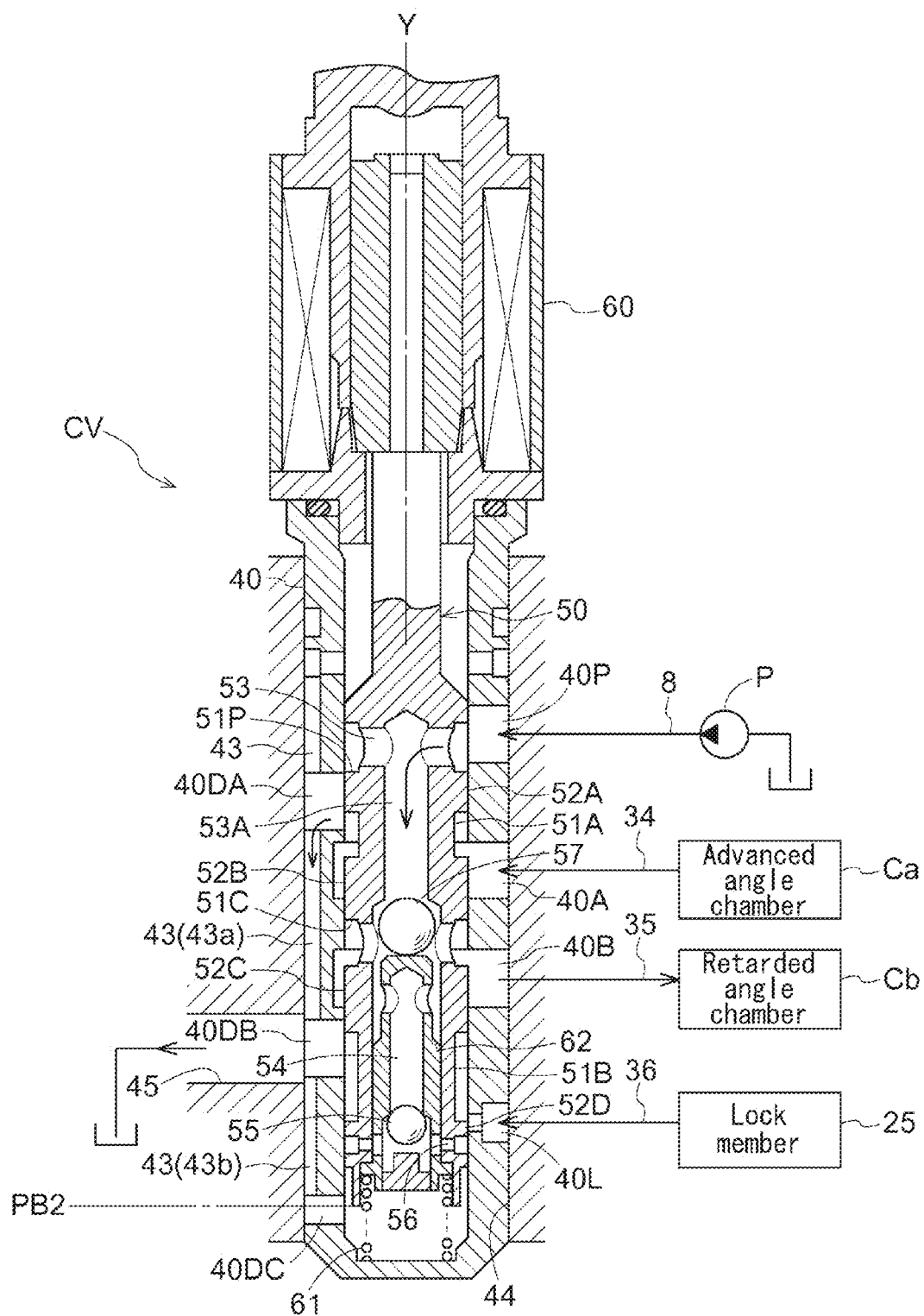
FIG. 9 is a schematic cross-sectional showing an operation of the control valve according to the embodiment disclosed here.

The second retarded angle position will be explained hereinafter. As illustrated in FIG. 9, at the second retarded angle position PB2, similarly to the first retarded angle position PB1, the operation oil supplied to the pump port 40P is supplied to the retarded angle port 40B via the phase control fluid passage 53 on the basis of the positional relationship between the second land portion 52B and the retarded angle port 40B. Further, the operation oil from the advanced angle port 40A is drained to the first drain port 40DA via the first groove portion 51A on the basis of the positional relationship between the second land portion 52B and the advanced angle port 40A. Further, the operation oil from the unlocking port 40L is drained to the second drain port 40DB. The operation oil drained to the first drain port 40DA is forwarded to the exhaust port 45 via the communication portion 43, then the operation oil is returned to the oil pan from the exhaust port 45. The operation oil drained to the second drain port 40DB is forwarded to the exhaust port 45, then the operation oil is returned to the oil pan from the exhaust port 45.

Modified examples will be explained hereinafter.

According to the embodiment, the control valve CV is applied to the variable valve timing control device A which is configured to change the open and close time (opening and closing timing) of the intake valve Va, however, the application of the control valve CV is not limited. For example, the control valve CV may be applied to a variable valve timing control device that is configured to change an open and close time (opening and closing timing) of an exhaust valve. Further, alternatively, the control valve CV may be applied to a device other than the variable valve timing control device A.

According to the embodiment, the exhaust port 45 is positioned facing the second drain port 40DB, however, the construction is not limited. According to an alternative construction, for example, the exhaust port 45 may be positioned at a downstream of the retarded angle port 40B. According to further alternative construction, the exhaust port 45 may be positioned between the third drain port 40DC and the second drain port 40DB. Particularly, exhaust port 45 may be formed at an inner surface of the attachment hole portion 44 between the third drain port 40DC and another drain port that is adjacent to the third drain port 40DC (e.g., second drain port 40DB). For example, the exhaust port 45 may be connected to the second connection portion 43*b* positioned between the second drain port 40DB and the third drain port 40DC. In those circumstances, the cross-sectional dimension of the second connection portion 43*b* (i.e., the second fluid passage) may be the same with the cross-sectional dimension of the first connection portion 43*a* (i.e., first fluid passage) or may be greater than the cross-sectional dimension of the first connection portion 43*a*. That is, as long as the operation oil drained from the third drain port 40DC is not affected by the first operation oil pressure of the operation fluid drained from the advanced angle chamber Ca (retarded angle chamber Cb) and does not flow in a reverse direction, the exhaust port 45 may be connected to the second connection portion 43*b*.

As long as the communication portion 43 for communicating the plural drain ports are formed on the outer periphery surface of the valve case 40, the plural supply and exhaust ports and the plural drain ports are not necessarily provided along the longitudinal direction of the valve case 40.

According to an alternative construction, the communication portion 43 formed on the outer periphery surface of the valve case 40 may be structured with a groove portion.

The disclosure is widely applicable to a control valve that includes plural drain ports.

According to the embodiment, a control valve (CV) includes a spool (50) formed with a fluid passage allowing a circulation of an operation fluid for switching a supply of the operation fluid to plural operation fluid supply portions (advanced angle chamber Ca, retarded angle chamber Cb, lock mechanism L), a cylindrical sleeve (40) including plural supply and exhaust ports (40A, 40B, 40L) supplying and exhausting the operation fluid to and from the plural operation fluid supply portions (Ca, Cb, L) and plural drain ports (40DA, 40DB, 40DC) allowing the operation fluid returning from the plural operation fluid supply portions (Ca, Cb, L) to drain, the sleeve (4) slidably accommodating the spool (50) therein, a solenoid mechanism (60) for changing a position of the spool (50) relative to the sleeve (40), and a communication portion (43) formed on an outer periphery surface of the sleeve (40), the communication portion (43) connected to plural drain ports (40DA, 40DB, 40DC).

According to the construction of the embodiment, because the communication portion (43) connected to the plural drain ports (40DA, 40DB, 40DC) is formed at the outer periphery surface of the sleeve, by connecting a single drain fluid passage to the communication portion (43), the operation fluid drained, or flowing out from the plural drain ports (40DA, 40DB, 40DC) can be returned to, for example, a tank via the drain fluid passage. Thus, a fluid passage formed at a device to which the control valve is mounted can be simplified.

According to the embodiment, the plural supply and exhaust ports (40A, 40B, 40L) are formed along a longitudinal direction of the sleeve (40) keeping a predetermined distance from each other, and the plural drain ports (40DA, 40DB, 40DC) are formed along the longitudinal direction of the sleeve (40) keeping a predetermined distance from each other at positions different from the supply and exhaust ports (40A, 40B, 40L) in a circumferential direction of the sleeve (40).

According to the construction of the embodiment, because the plural supply and exhaust ports (40A, 40B, 40L) are formed along the longitudinal direction of the sleeve (40) keeping the predetermined distances from each other and the drain ports (40DA, 40DB, 40DC) and the supply and exhaust ports (40A, 40B, 40L) are arranged at positions different from one another in the circumferential direction of the sleeve (40), the communication portion (43) can be readily formed.

According to the embodiment, the communication portion (43) corresponds to a chamfer portion that is formed by chamfering an outer periphery surface of the sleeve (40) along a longitudinal direction of the outer periphery surface of the sleeve (40).

According to the construction of the embodiment, because the communication portion is a chamfered portion formed in a plane shape along the longitudinal direction of the sleeve, the communication portion can be readily formed.

According to the embodiment, the control valve (CV) is applied to a variable valve timing control device (A) configured to change an opening and closing timing of a valve which is provided at an internal combustion engine for an intake and exhaust of air and including a lock mechanism (L) for fixing the opening and closing timing of the valve at an intermediate phase between a most advanced angle phase and a most retarded angle phase. The plural drain ports (40DA, 40DB, 40DC) includes a first drain port (40DA) allowing the operation fluid to drain when a relative phase is changed to a retarded angle phase, a second drain port (40DB) allowing the operation fluid to drain when the relative phase is changed to an advanced angle phase, and a third drain port (40DC) allowing the operation fluid to drain when the lock mechanism (L) is unlocked. The communication portion (43) includes a first connection portion (43*a*) connecting the first drain port (40DA) and the second drain port (40DB) and a second connection portion (43*b*) connecting the second drain port (40DB) and the third drain port (40DC), and a cross-sectional dimension of the first connection portion (43a) is greater than a cross-sectional dimension of the second connection portion (43b).

Generally, the volume of the operation fluid drained, or flowing out from the advanced angle chamber Ca and the retarded angle chamber Cb to the drain port ( ) is greater than the volume of the operation fluid drained, or flowing out from the lock mechanism (L) to the drain port ( ). According to the construction of the embodiment, because the cross-sectional dimension of the first connection portion (43a) connecting the first drain port (40DA) and the second drain port (40DB) is greater than the cross-sectional dimension of the second connection portion (43b) connecting the second drain port (40DB) and the third drain port (40DC), the operation fluid can be drained, or can flow out from the first drain port (40DA) and the second drain port (40DB) in a short period. In consequence, a state where the operation fluid in the first drain port (40DA) and the second drain port (40DB) affects the operation fluid drained from the third drain port (40DC) when the operation fluid drains, or flows out from the third drain port (40DC) can be resolved at an early stage.

According the embodiment, an attachment structure of a control valve is disclosed. The control valve includes a spool (50) formed with a fluid passage allowing a circulation of an operation fluid for switching a supply of the operation fluid to plural operation fluid supply portions (Ca, Cb, L), a cylindrical sleeve (40) including plural supply and exhaust ports (40A, 40B, 40L) supplying and exhausting the operation fluid to and from the plural operation fluid supply portions (Ca, Cb, L) and plural drain ports (40DA, 40DB, 40DC) allowing the operation fluid returning from the plural operation fluid supply portions (Ca, Cb, L) to drain, the sleeve (4) slidably accommodating the spool (50) therein, a solenoid mechanism (60) for changing a position of the spool (50) relative to the sleeve (40), and a communication portion (43) formed on an outer periphery surface of the sleeve (40), the communication portion (43) connected to plural drain ports (40DA, 40DB, 40DC). The plural supply and exhaust ports (40A, 40B, 40L) are formed along a longitudinal direction of the sleeve (40) keeping a predetermined distance from each other, and the plural drain ports (40DA, 40DB, 40DC) are formed along the longitudinal direction of the sleeve (40) keeping a predetermined distance from each other at positions different from the supply and exhaust ports (40A, 40B, 40L) in a circumferential direction of the sleeve (40). The communication portion (43) corresponds to a chamfer portion that is formed by chamfering an outer periphery surface of the sleeve (40) along a longitudinal direction of the outer periphery surface of the sleeve (40). The control valve (CV) is applied to a variable valve timing control device (A) configured to change an opening and closing timing of a valve which is provided at an internal combustion engine for an intake and exhaust of air and including a lock mechanism (L) for fixing the opening and closing timing of the valve at an intermediate phase between a most advanced angle phase and a most retarded angle phase. The plural drain ports (40DA, 40DB, 40DC) includes a first drain port (40DA) allowing the operation fluid to drain when a relative phase is changed to a retarded angle phase, a second drain port (40DB) allowing the operation fluid to drain when the relative phase is changed to an advanced angle phase, and a third drain port (40DC) allowing the operation fluid to drain when the lock mechanism (L) is unlocked. The communication portion (43) includes a first connection portion (43a) connecting the first drain port (40DA) and the second drain port (40DB) and a second connection portion (43b) connecting the second drain port (40DB) and the third drain port (40DC), and a cross-sectional dimension of the first connection portion (43a) is greater than a cross-sectional dimension of the second connection portion (43b). The attachment structure includes an attachment hole portion (44) to which the sleeve (40) is inserted to be fixed, the attachment hole portion (44) formed on a wall portion of the internal combustion engine (E), the third drain port (40DC) being formed at a furthermost end portion relative to the other drain ports (40DA, 40DB), and an exhaust port (45) connected to the communication portion (43) for circulating the operation fluid in the communication portion (43) inside the internal combustion engine (E), the exhaust port (45) being formed between the third drain port (40DC) and another drain port (40DB) that is adjacent to the third drain port (40DC) at an inner surface of the attachment hole portion (44).

Generally, the volume of the operation fluid supplied to and exhausted from the lock mechanism is smaller than the volume of the operation fluid that is supplied to and exhausted from the advanced angle chamber and the retarded angle chamber. In those circumstances, the exhaust port is connected to the communication portion so that the operation fluid in the communication portion re-circulates inside the internal combustion engine. Thus, in a case where the communication portion between the third drain port and the exhaust port overlaps with the communication portion between the first drain port and the exhaust port or the communication portion between the second drain port and the exhaust port at a part of the region, the third drain port may be influenced by the pulsation (pressure wave) of the operation fluid drained, or flowing out from the first drain port or the second drain port. In consequence, the unlocking operation of the lock mechanism may be delayed due to the time required for draining the operation fluid from the third drain port, or the lock mechanism may be unintentionally unlocked.

However, according to the construction of the embodiment, the communication portion (43) from the third drain port (40DC) to the exhaust port (45) is entirely (thoroughly) divided (separated) from the communication portion (43) from other drain ports (40DA, 40DB) to the exhaust port (45), and the operation fluid drained, or flowing out from other drain ports (40DA, 40DB) is exhausted before affecting the operation fluid in the third drain port (40DC). Thus, the lock mechanism (L) can be operation more securely.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A control valve, comprising:
    a spool formed with a fluid passage allowing a circulation of an operation fluid for switching a supply of the operation fluid to plural operation fluid supply portions;
    a cylindrical sleeve including plural supply and exhaust ports supplying and exhausting the operation fluid to and from the plural operation fluid supply portions, and plural drain ports allowing the operation fluid returning from the plural operation fluid supply portions to drain, the sleeve slidably accommodating the spool therein;
a solenoid mechanism for changing a position of the spool relative to the sleeve;
a communication portion formed on an outer periphery surface of the sleeve, the communication portion connected to plural drain ports;
the control valve applied to a variable valve timing control device configured to change an opening and closing timing of a valve which is provided at an internal combustion engine for an intake and exhaust of air and including a lock mechanism for fixing the opening and closing timing of the valve at an intermediate phase between a most advanced angle phase and a most retarded angle phase, wherein the plural drain ports includes a first drain port allowing the operation fluid to drain when a relative phase is changed to a retarded angle phase, a second drain port allowing the operation fluid to drain when the relative phase is changed to an advanced angle phase, and a third drain port allowing the operation fluid to drain when the lock mechanism is unlocked; and
the communication portion includes a first connection portion connecting the first drain port and the second drain port and a second connection portion connecting the second drain port and the third drain port, and a cross-sectional dimension of the first connection portion is greater than a cross-sectional dimension of the second connection portion.

2. The control valve according to claim 1, wherein the plural supply and exhaust ports are formed along a longitudinal direction of the sleeve keeping a predetermined distance from each other, and the plural drain ports are formed along the longitudinal direction of the sleeve keeping a predetermined distance from each other at positions different from the supply and exhaust ports in a circumferential direction of the sleeve.

3. The control valve according to claim 1, wherein the communication portion corresponds to a chamfer portion that is formed by chamfering an outer periphery surface of the sleeve along a longitudinal direction of the outer periphery surface of the sleeve.

4. An attachment structure of a control valve, the control valve comprising:
a spool formed with a fluid passage allowing a circulation of an operation fluid for switching a supply of the operation fluid to plural operation fluid supply portions;
a cylindrical sleeve including plural supply and exhaust ports supplying and exhausting the operation fluid to and from the plural operation fluid supply portions, and plural drain ports allowing the operation fluid returning from the plural operation fluid supply portions to drain, the sleeve slidably accommodating the spool therein;
a solenoid mechanism for changing a position of the spool relative to the sleeve;
a communication portion formed on an outer periphery surface of the sleeve, the communication portion connected to plural drain ports; wherein
the plural supply and exhaust ports are formed along a longitudinal direction of the sleeve keeping a predetermined distance from each other, and the plural drain ports are formed along the longitudinal direction of the sleeve keeping a predetermined distance from each other at positions different from the supply and exhaust ports in a circumferential direction of the sleeve;
the communication portion corresponds to a chamfer portion that is formed by chamfering an outer periphery surface of the sleeve along a longitudinal direction of the outer periphery surface of the sleeve;
the control valve is applied to a variable valve timing control device configured to change an opening and closing timing of a valve which is provided at an internal combustion engine for an intake and exhaust of air and including a lock mechanism for fixing the opening and closing timing of the valve at an intermediate phase between a most advanced angle phase and a most retarded angle phase;
the plural drain ports includes a first drain port allowing the operation fluid to drain when a relative phase is changed to a retarded angle phase, a second drain port allowing the operation fluid to drain when the relative phase is changed to an advanced angle phase, and a third drain port allowing the operation fluid to drain when the lock mechanism is unlocked; and
the communication portion includes a first connection portion connecting the first drain port and the second drain port and a second connection portion connecting the second drain port and the third drain port, and a cross-sectional dimension of the first connection portion is greater than a cross-sectional dimension of the second connection portion; and wherein
the attachment structure includes an attachment hole portion to which the sleeve is inserted to be fixed, the attachment hole portion formed on a wall portion of the internal combustion engine;
the third drain port being formed at a furthermost end portion relative to the other drain ports; and
an exhaust port connected to the communication portion for circulating the operation fluid in the communication portion inside the internal combustion engine, the exhaust port being formed between the third drain port and another drain port that is adjacent to the third drain port at an inner surface of the attachment hole portion.

* * * * *